(12) United States Patent
Hagiwara

(10) Patent No.: US 7,351,051 B2
(45) Date of Patent: Apr. 1, 2008

(54) POWDER SINTER LAYERED MANUFACTURING APPARATUS

(75) Inventor: Masashi Hagiwara, Tokyo (JP)

(73) Assignee: Aspect Inc. (JP)

( * ) Notice: Subject to any disclaimer, the term of this patent is extended or adjusted under 35 U.S.C. 154(b) by 133 days.

(21) Appl. No.: 11/477,560

(22) Filed: Jun. 30, 2006

(65) Prior Publication Data
US 2007/0026099 A1 Feb. 1, 2007

(30) Foreign Application Priority Data
Jul. 26, 2005 (JP) ............................. 2005-215749

(51) Int. Cl.
*B29B 13/08* (2006.01)
(52) U.S. Cl. .................. 425/174.4; 425/182; 425/186; 425/375; 264/113; 264/497; 264/308; 264/401
(58) Field of Classification Search ............ 425/174.4, 425/375, 182, 185, 186; 264/308, 401, 497, 264/113; 419/61
See application file for complete search history.

(56) References Cited

U.S. PATENT DOCUMENTS 5,252,264 A * 10/1993 Forderhase et al. ......... 264/497
6,375,874 B1 * 4/2002 Russell et al. .............. 264/28
6,554,600 B1 4/2003 Hofmann et al. ......... 425/174.4

FOREIGN PATENT DOCUMENTS

JP 2002-527613 8/2002

* cited by examiner

*Primary Examiner*—Yogendra N. Gupta
*Assistant Examiner*—Maria Veronica Ewald
(74) *Attorney, Agent, or Firm*—Bacon & Thomas, PLLC

(57) ABSTRACT

A powder sinter layered manufacturing apparatus is provided with a first container 13 of a cylindrical shape for defining a first manufacturing region, a first manufacturing table 15 configured to move vertically along an inner wall of the first container 13, a second container 17 of the cylindrical shape for defining a second manufacturing region within the first manufacturing region, detachably fitted to the first container easily, and provided with a flange which covers an upper face located outside the second manufacturing region but inside first container 13, and a second manufacturing table 15b configured to move vertically up and down along an inner wall of the second container 17.

8 Claims, 13 Drawing Sheets

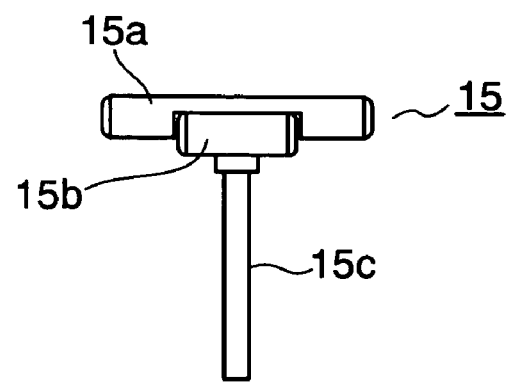
FIG. 5A
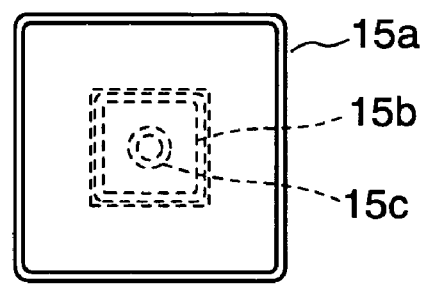
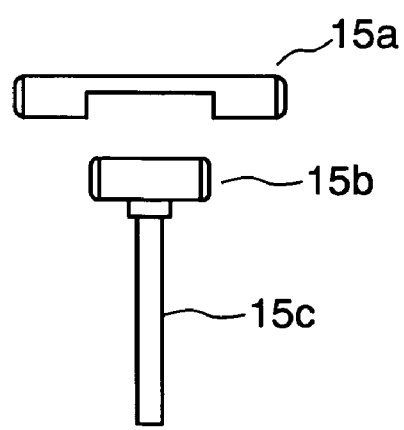
FIG. 5B
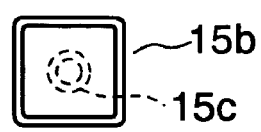

ent product. The control device 101C, after
POWDER SINTER LAYERED MANUFACTURING APPARATUS

CROSS-REFERENCE TO RELATED APPLICATIONS

This application is based on and claims priority of Japanese Patent Application No. 2005-215749 filed on Jul. 26, 2005, the entire contents of which are incorporated herein by reference.

BACKGROUND OF THE INVENTION

1. Field of the Invention

The present invention relates to a powder sinter layered manufacturing apparatus. More specifically, the present invention relates to a powder sinter layered manufacturing apparatus for fabricating a three-dimensionally manufactured product by laminating multiple sintered thin layers on a manufacturing table.

2. Description of the Prior Art

In recent years, there is an increasing demand for layered manufacturing apparatuses which make it possible to manufacture components used in prototypes for functional tests, components used in a variety of products in small quantities, and the like.

As some examples of layered manufacturing apparatuses which meet such a demand, there are powder sinter layered manufacturing apparatuses and layered manufacturing apparatuses applying ultraviolet curing resin (hereinafter referred to as a "stereolithography apparatus"). Among them, the powder sinter layered manufacturing apparatus has a major advantage of compatibility with various types of materials including rigid materials, unlike the stereolithography apparatus. Accordingly, powder sinter layered manufacturing apparatuses are gaining market recognition and being introduced to various applications.

FIG. 1 is a perspective view of a powder sinter layered manufacturing apparatus currently available in the market. As shown in FIG. 1, this powder sinter layered manufacturing apparatus is constituted of a laser beam emitting section 101A, a manufacturing section 101B, and a control device 101C.

The laser beam emitting section 101A is provided with a laser beam light source 1 and a mirror 2 for controlling a direction of irradiation of the laser beam.

The manufacturing section 101B includes a manufacturing container 3 which is disposed in a central part and used for manufacturing by irradiation of the laser beam to fabricate three-dimensionally manufactured products, and powder material containers 4a and 4b which are disposed on both sides of the manufacturing container 3 and used for storing powder materials. Moreover, a part table 5 is disposed inside the manufacturing container 3, and is configured to move up and down along inner walls of the manufacturing container 3. Feed tables 6a and 6b are disposed inside the powder material containers 4a and 4b, and are configured to move up and down along inner walls of the powder material containers 4a and 4b.

The control device 101C is configured to supply a powder material 8 onto the part table 5 with a recoater 7 by lowering the part table 5 in an amount equivalent to one thin layer while raising the feed table 6b, to form a powder material thin layer 8a on the part table 5. Then, the control device 101C is configured to selectively heat and sinter the powder material thin layer 8a on the basis of slice data (a drawing pattern) for a three-dimensionally manufactured product by using the laser beam and the control mirror 2. Further, the control device 101C is configured to repeat the foregoing operations as appropriate so as to form the three-dimensionally manufactured product. The control device 101C, after forming the three-dimensionally manufactured product in this way, is configured to cool down by cooling means in the end.

In general, the above-described powder sinter layered manufacturing apparatus has a smaller manufacturable XY-plane area in the manufacturing container 3 in comparison with a stereolithography apparatus. For example, one of the most popular large-size stereolithography apparatuses can deal with the maximum manufacturing size of an XY-plane area of up to 600 mm×600 m. On the other hand, a typical powder sinter layered manufacturing apparatus can only deal with an XY-plane area up to 380 mm×330 mm.

Incidentally, there is a growing demand in recent years for integrally manufacturing a large-size product which has not been manufacturable with a conventional apparatus. For this background, large-size powder sinter layered manufacturing apparatuses having the maximum manufacturable XY-plane area of 550 mm×550 mm, which is almost equivalent to the maximum manufacturable size of the stereolithography apparatuses, are being introduced to the market.

On the other hand, however, components used in prototypes for functional tests or products of many varieties in small quantities are not always suitable for such large-size layered manufacturing apparatuses. Many of those components or the like may be manufactured sufficiently within the conventional small plane area. In these cases, the following two problems are unavoidable with an increase in the XY-plane manufacturable size of the powder sinter lamination apparatuses.

(1) Increase in Cooling Time

A powder sinter layered manufacturing apparatus is configured to laminate powder material thin layers sequentially inside a manufacturing container, then to selectively heat and sinter the thin layers in order to fabricate a three-dimensionally manufactured product. Accordingly, the sintered thin layers and the unsintered powder materials remaining around the sintered thin layers are left inside the manufacturing container. Unlike the stereolithography apparatus, the powder sinter layered manufacturing apparatus of this type is generally configured to set a surface temperature of a laminated object at a temperature lower than the melting point of a manufacturing material by around 10° C., and to manufacture a product while controlling the temperature on the entire XY plane of the manufacturing container to be even. These operations are conducted in order to prevent warpage of a manufactured product and to effectuate manufacturing even by making a laser output relatively smaller. In this case, after completion of manufacturing, if the manufactured product is rapidly cooled down or if the manufactured product is taken out in a state where the manufactured product is not completely cooled down, the temperature may become uneven between the inside and outside of the manufactured product. Such a condition may lead to distortion of the manufactured product caused by consequent thermal stress or may complicate maintenance of accuracy.

To avoid these problems, it is essential to cool the manufactured product naturally and slowly down to an appropriate temperature for allowing an operator to take out the product out of the powder materials after manufacturing is complete. As for a guideline of such natural cooling time, a cooling period of about 20 hours is required for manufacturing by use of a manufacturing container capable of manufacturing a model having the manufacturable XY plane of 380 mm×330 mm and a manufacturable depth in the Z direction of 400 mm, for example. Meanwhile, it can be said that, when the depth in the Z direction is not extremely shallow in comparison with the manufacturable plane area, the cooling time is extended in proportion to the plane area thereof. For example, the plane area of the XY plane of 380 mm×330 mm is equal to 125,400 mm$^2$ while the plane area in the case of 600 mm×600 mm is equal to 360,000 mm$^2$. Accordingly, the latter area is about 2.9 times as large as the former area and the cooling time is also extended in proportion to this ratio. In addition, when manufacturing a product by use of the manufacturing container capable of manufacturing a model having the larger manufacturable plane area as mentioned above and the depth in the Z direction of 400 mm, which is the same as that mentioned above, the cooling time should require about 58 hours.

As described above, the cooling time is increased and the time for actually taking out the manufactured product is therefore delayed in case of using the manufacturing container having the unnecessarily large manufacturable XY-plane area in spite of manufacturing only a small object. Such an increase in time leads to a decline in operating efficiency.

(2) Alteration of Materials

In the case of a stereolithography apparatus, photocuring resin is heated up to approximately 40° C. and controlled at a constant temperature in order to promote a curing reaction at a portion subjected to irradiation of an ultraviolet laser and to maintain a fablication liquid level. Here, it is safe to say that alteration of materials caused by such a temperature rise is very little.

In the case of the powder sinter layered manufacturing apparatus, the entire surface of the powder material inside the manufacturing container is set to a temperature lower than the melting point of that material by around 10° C. For example, in the case of nylon used as a principal material of the powder sinter layered manufacturing apparatus, the entire surface is set to a relatively high temperature around 180° C. As a consequence, the powder material once used for manufacturing is altered by heat and has to be discarded as the case may be. Therefore, when manufacturing a small manufactured product relative to the maximum manufacturable plane area with the powder sinter layered manufacturing apparatus, the powder material may be wasted more than necessary.

As described above, in the case of manufacturing a manufactured product having a small plane area, the powder sinter layered manufacturing apparatus provided with the unnecessarily large manufacturing container may incur an increase in the cooling time and waste of the originally reusable powder material due to alteration in the quality. On the other hand, installation of an additional small-size powder sinter layered manufacturing apparatus to accommodate fabrication of smaller components causes problems in terms of expenses for installation, operating efficiency of the apparatuses, spaces for installation, and so forth.

SUMMARY OF THE INVENTION

An object of the present invention is to provide a powder sinter layered manufacturing apparatus which makes it possible to integrally manufacture a large object, shorten cooling time after manufacturing when manufacturing a small object, and reduce an amount of a powder material altered in quality by heating.

The powder sinter layered manufacturing apparatus according to the present invention is provided with a first partition wall which defines a first manufacturing region and a first table which moves vertically along an inner wall of the first partition wall. In addition, the powder sinter layered manufacturing apparatus is provided with a second partition wall, which defines a second manufacturing region inside the first manufacturing region, and which has a flange to be hooked on an upper end of the first partition wall, and a second table which moves vertically along an inner wall of the second partition wall. Here, a large object is manufactured in the first manufacturing region and a small object is manufactured in the second manufacturing region.

Therefore, both of the large object and the small object are manufacturable by use of the single powder sinter layered manufacturing apparatus.

Moreover, since the large first manufacturing region is used for manufacturing the large object, the large object is manufacturable integrally.

In the meantime, since the small second manufacturing region is used for manufacturing the small object, the amount of the powder material remaining around the manufactured product can be reduced, cooling time after manufacturing can be shortened even in the case of preliminary heating, and the amount of the powder material altered by preliminary heating can be reduced.

BRIEF DESCRIPTION OF THE DRAWINGS

FIGS. 5A and 5B are cross-sectional views and top plan views showing a configuration of a part table used in the powder sinter layered manufacturing apparatus according to the embodiment of the present invention.

DESCRIPTION OF THE PREFERRED EMBODIMENTS

Now, an embodiment of the present invention will be described with reference to the accompanying drawings.

(Description of Powder Sinter Layered Manufacturing Apparatus)

Figure 1:
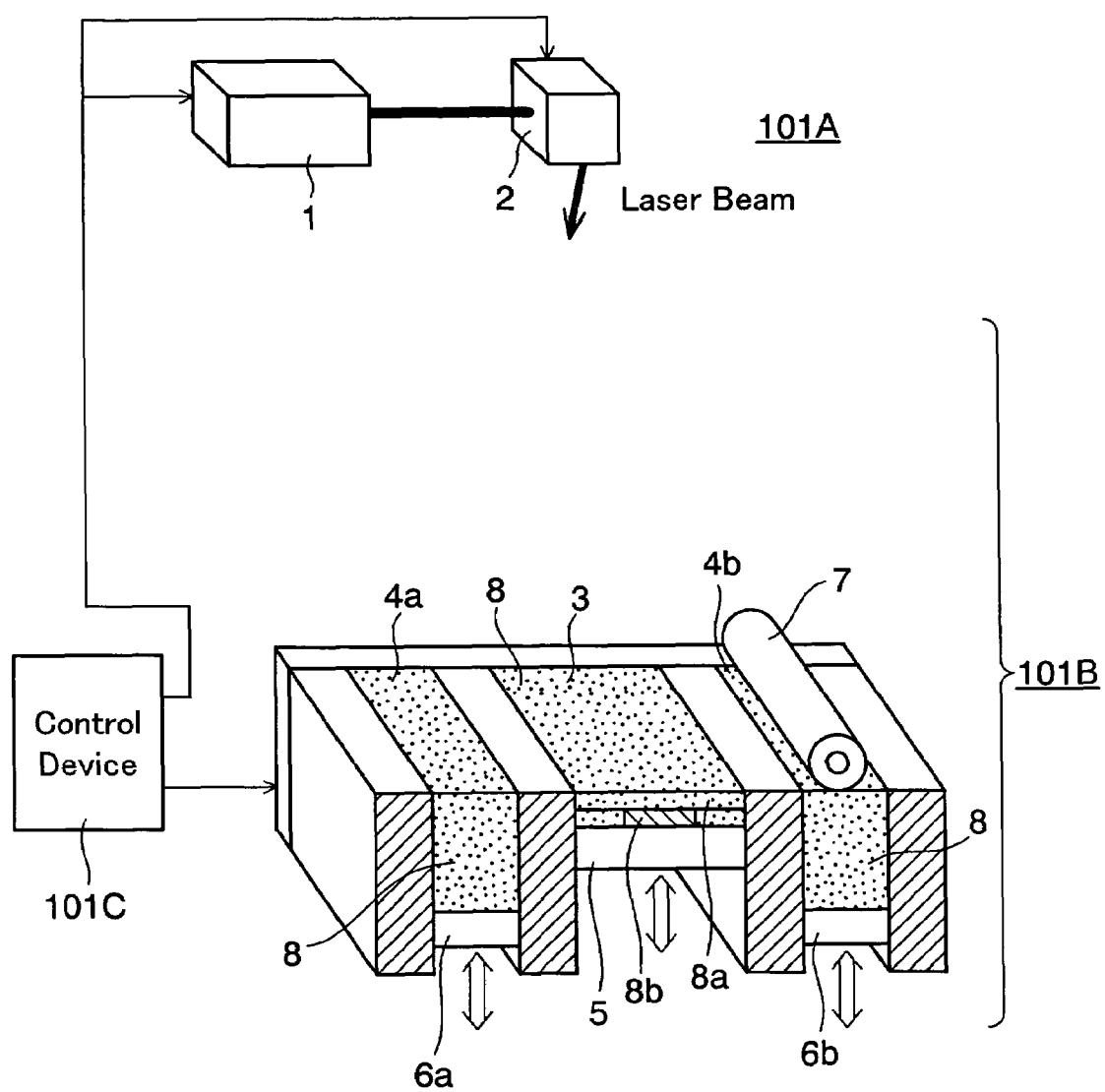
FIG. 1 is a perspective view showing a powder sinter layered manufacturing apparatus of the prior art.
Figure 2:
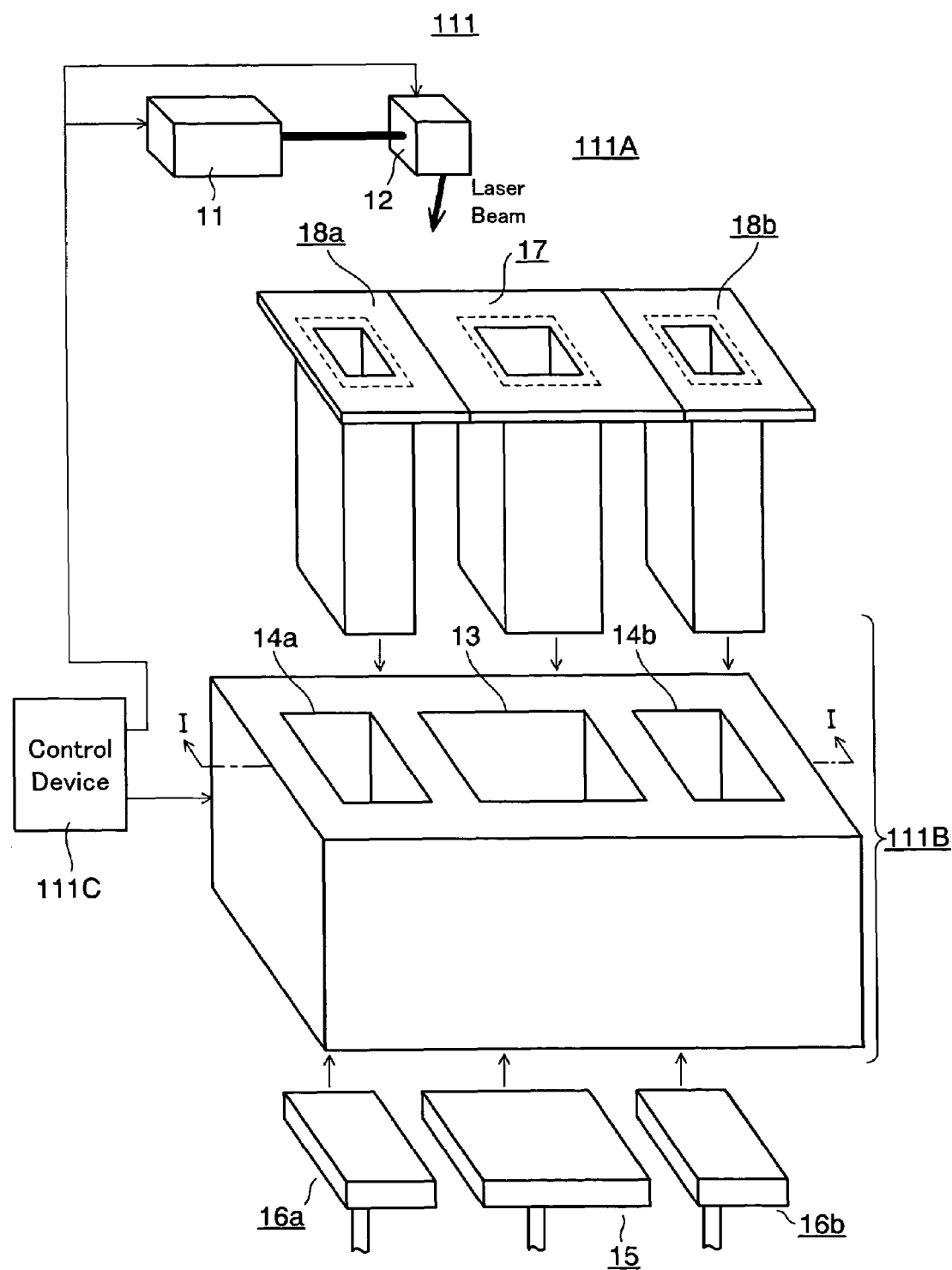
FIG. 2 is a perspective view showing a configuration of a powder sinter layered manufacturing apparatus according to an embodiment of the present invention.
Figure 3A:
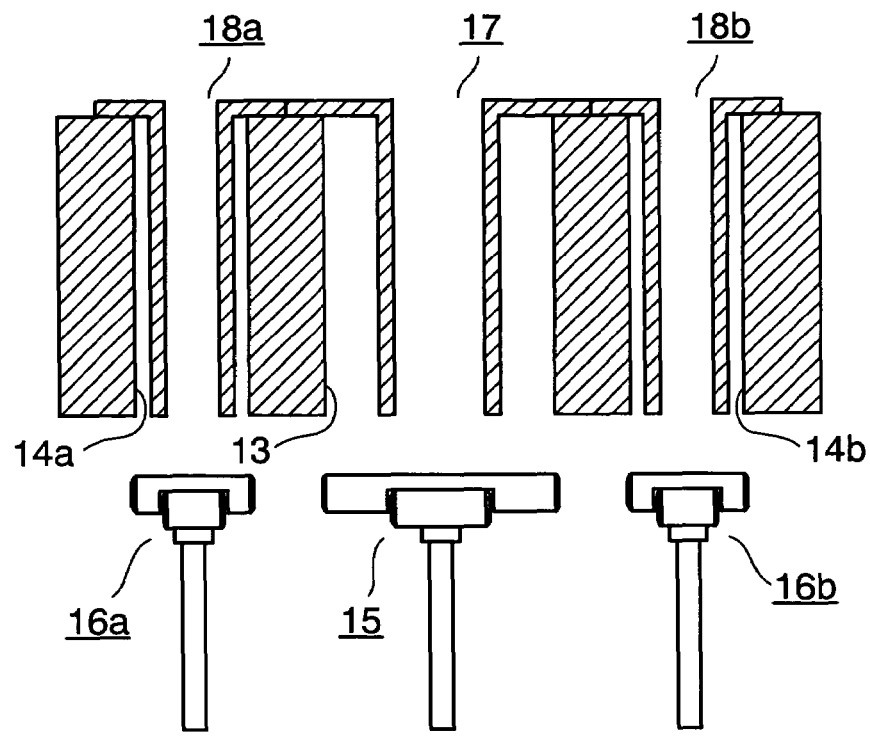
FIG. 3A is a cross-sectional view of the powder sinter layered manufacturing apparatus taken along the I-I line in FIG. 2.
Figure 3B:
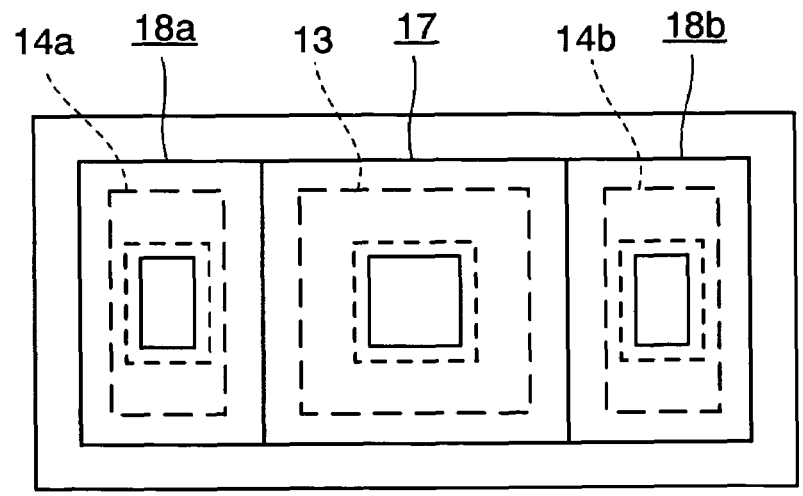
FIG. 3B is a top plan view of the powder sinter layered manufacturing apparatus.

FIG. 2 is a perspective view showing a configuration of a powder sinter layered manufacturing apparatus according to an embodiment of the present invention. FIG. 3A is a cross-sectional view of the powder sinter layered manufacturing apparatus taken along the I-I line in FIG. 2 after setting a second manufacturing container 17 and second powder material containers 18a and 18b into a first manufacturing container 13 and first powder material containers 14a and 14b, which mainly shows portions of the manufacturing containers and the powder material containers on both sides thereof. FIG. 3B is a top plan view of those portions.

As shown in FIG. 2, this powder sinter layered manufacturing apparatus 111 includes a laser beam emitting section 111A, a manufacturing section 111B, and a control device 111C.

The laser beam emitting section 111A is provided with a laser beam light source 11 and a mirror 12 for controlling a direction of irradiation of the laser beam. The laser beam emitted from the light source 11 is selectively irradiated on a powder material thin layer on a part table 15 of the manufacturing section 111B in accordance with mirror control by a computer. For example, the mirror control is performed by the computer on the basis of slice data (a drawing pattern) for a three-dimensionally manufactured product to be fabricated. The laser beam light source 11 and the mirror 12 collectively constitute heating and sintering means.

As shown in FIG. 2 to FIG. 3, the manufacturing section 111B is provided with a first manufacturing container (a first partition wall) 13 of a rectangular cylindrical shape, which is used for manufacturing by irradiation of the laser beam to fabricate the three-dimensionally manufactured product, and first powder material containers 14a and 14b of the rectangular cylindrical shape, which are disposed on both sides of the first manufacturing container 13 and used for storing powder materials. A region enclosed by inner walls of the first manufacturing container 13 constitutes a manufacturing area (a first manufacturing region), and regions enclosed by inner walls of the first powder material containers 14a and 14b constitute powder material containing areas (first containing regions).

Meanwhile, a second manufacturing container (a second partition wall) 17 of the rectangular cylindrical shape can be detachably fitted in the first manufacturing container 13 while second powder material containers 18a and 18b of a rectangular cylindrical shape can be detachably fitted in the first powder material containers 14a and 14b.

Figure 4A:
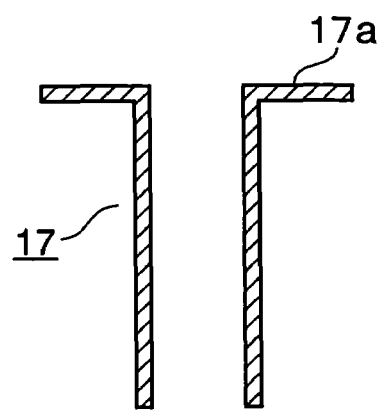
FIG. 4A is a set of a cross-sectional view and a top plan view showing a configuration of a second manufacturing container to be set inside a first manufacturing container used for the powder sinter layered manufacturing apparatus according to the embodiment of the present invention.
Figure 4A:
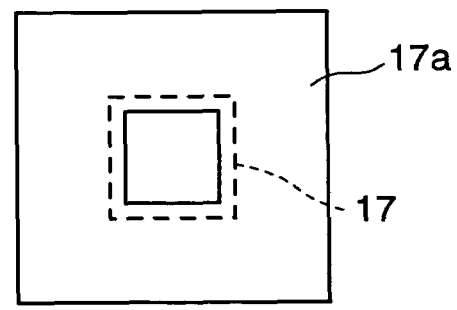
Figure 4B:
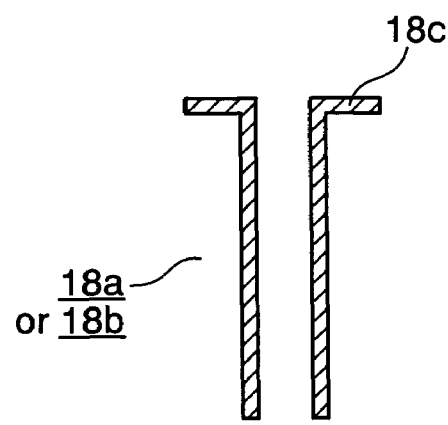
FIG. 4B is a set of a cross-sectional view and a top plan view showing a configuration of a second powder material container to be set inside a first powder material container to be used similarly.
Figure 4B:
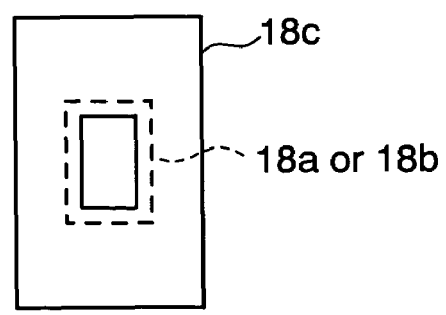

The second manufacturing container 17 is installed inside the first manufacturing container 13 when fabricating a small-size manufactured product, and defines a manufacturing area (a second manufacturing region), which is smaller than the manufacturing area of the first manufacturing container 13, inside the first manufacturing container 13 as shown in FIG. 4A. The second manufacturing container 17 is provided with a flange 17a located on the outside of walls of the container 17 so as to cover an upper surface of the inside of the first manufacturing container 13. Meanwhile, the second powder material containers 18a and 18b are respectively installed inside the first powder material containers 14a and 14b when fabricating the small-size manufactured product, and define containing areas (second containing regions), which are smaller than the containing areas of the first powder material containers 14a and 14b, inside the first powder material containers 14a and 14b as shown in FIG. 4B. The second powder material containers 18a and 18b respectively include flanges 18c located on the outside of walls of the second powder material containers 18a and 18b so as to cover upper surfaces of the inside of the first powder material containers 14a and 14b. All of the flanges 17a and 18c of the second containers have a function to avoid powder materials from falling in space areas of the first containers 13, 14a, and 14b when setting the second containers 17, 18a, and 18b inside the first containers 13, 14a, and 14b, and a function to hook the flanges 17a and 18c on the first containers 13, 14a, and 14b and thereby to support the second containers 17, 18a, and 18b on the first containers 13, 14a, and 14b.

Figure 6A:
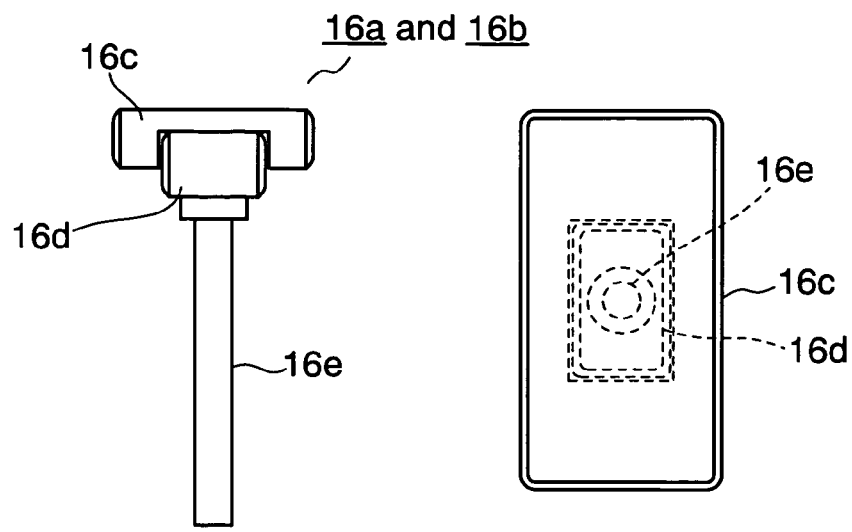
FIGS. 6A and 6B are cross-sectional views and top plan views showing a configuration of a feed table used in the powder sinter layered manufacturing apparatus according to the embodiment of the present invention.

A part table (a first table) 15 as shown in FIG. 5A is installed inside the first manufacturing container 13, and is vertically up and down movable along the inner walls of the first manufacturing container 13 while placing lamination of sintered thin layers that constitute the three-dimensionally manufactured product. Powder material thin layers are sequentially formed on the part table 15, and the respective powder material thin layers are heated and sintered independently. Meanwhile, feed tables (first powder material supply tables) 16a and 16b as shown in FIG. 6A are respectively installed inside the first powder material containers 14a and 14b, and are vertically up and down movable along the inner walls of the containers while placing the powder materials to thereby supply the powder materials.

As shown in FIG. 5B, the first part table 15 includes two plate members 15a and 15b, which are vertically stacked together, and which have flat surfaces each constituting a placement surface for the manufactured product. Usually, the two plate members 15a and 15b are integrated together with unillustrated screws or the like as shown in FIG. 5A. The upper plate member 15a is detached when using the second manufacturing container 17. Packing rubber or the like is attached to entire side surfaces of the plate members 15a and 15b. This is provided in order to maintain close contacts between the tables and the inner walls of the containers so as to prevent the powder materials from leaking from gaps, which may be generated between the tables and the inner walls of the containers if there is not any packing rubber or the like, when the tables are set inside the first and second manufacturing containers.

Figure 6B:
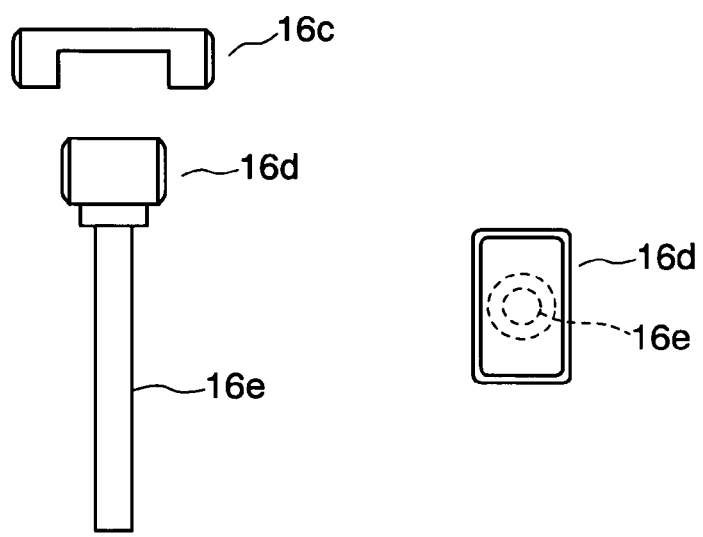

Moreover, as shown in FIG. 6B, each of the first feed tables 16a and 16b includes two plate members 16c and 16d, which are vertically stacked together, and which have flat surfaces constituting a placement surface for the powder material, like the first part table 15. Usually, the two plate members 16c and 16d are integrated together with unillustrated screws or the like as shown in FIG. 6A. The upper plate member 16c is detached when using the second powder material container 18a or 18b. In this case as well, packing rubber or the like is attached to entire side surfaces of the plate members 16c and 16d. This is provided in order to maintain close contacts between the tables and the inner walls of the containers so as to prevent the powder materials from leaking from gaps, which may be generated between the tables and the inner walls of the containers if there is not any packing rubber or the like, when the tables are set inside the first and second manufacturing containers.

Figure 7A:
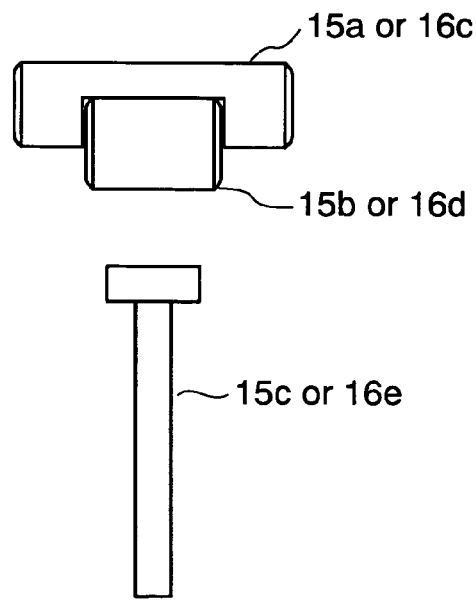
FIG. 7A is a cross-sectional view.
Figure 7B:
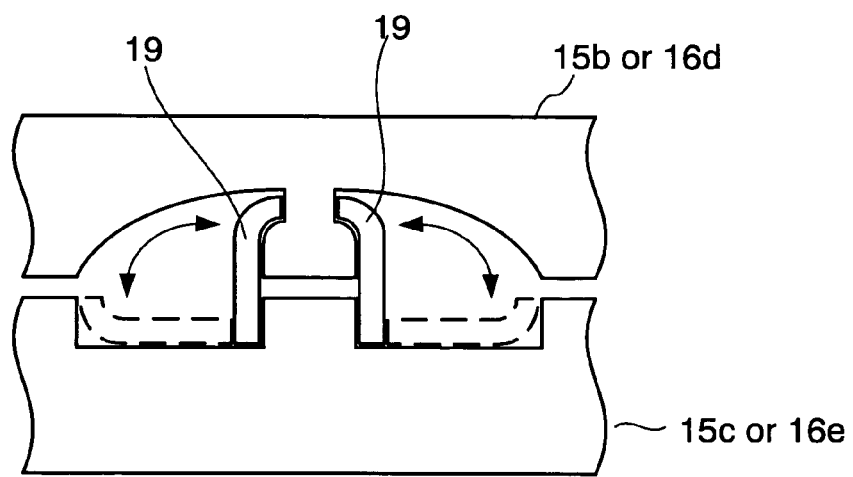
FIG. 7B is a partial cross-sectional views, showing a configuration of an attachment and detachment mechanism of driving means to the part table and the feed table used in the powder sinter layered manufacturing apparatus according to the embodiment of the present invention.

As shown in FIG. 7A, a detachable supporting shaft 15c is fitted to the first part table 15 and a detachable supporting shaft 16e is fitted to each of the first feed tables 16a and 16b. As shown in FIG. 7B, each fitting of the supporting shafts 15c and 16e is completed by pinching a convex portion provided on a lower part of each of the plate members 15b and 16d with a hook member 19 provided on one end of each of the supporting shafts 15c and 16e. The other ends of the supporting shafts 15c and 16e are connected to driving devices which cause the supporting shafts 15c and 16e to move vertically.

As shown in FIG. 5B, a second part table (a second table) 15b is installed inside the second manufacturing container 17, and is configured to place a lamination of multiple sintered thin layers and to move vertically up and down along the inner walls of the cylindrical container. Meanwhile, as shown in FIG. 6B, second feed tables (second powder material supply tables) 16d are installed inside the second powder material containers 18a and 18b and are configured to place the powder materials and to move vertically up and down along the inner walls of the cylindrical containers. Moreover, as shown in FIG. 3B, a width in the longitudinal direction of the containing area for the powder material is set approximately equal to a width in the longitudinal direction of the manufacturing area. This design is intended to avoid unnecessary supply of the powder material to regions other than the manufacturing area when supplying the powder material to the manufacturing area by use of a recoater.

The second manufacturing container 17 and the first part table 15 are attachable to and detachable from the first manufacturing container 13, while the second part table 15b is attachable to and detachable from the second manufacturing container 17. Moreover, the second powder material containers 18a and 18b as well as the first feed tables 16a and 16b are attachable to and detachable from the first powder material containers 14a and 14b, while the second feed tables 16d are attachable to and detachable from the second powder material containers 18a and 18b.

Figure 9:
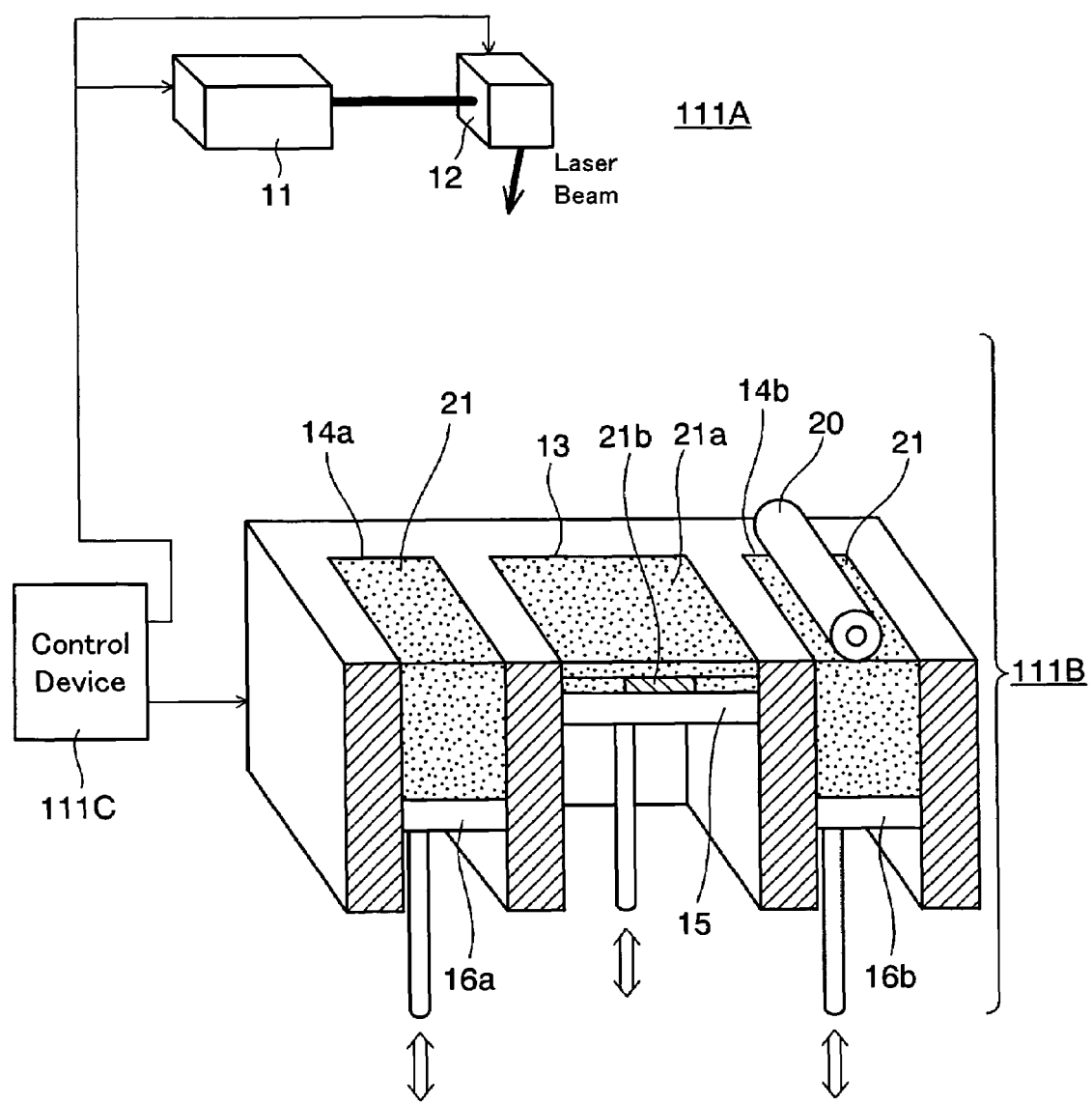
FIG. 9 is a perspective view showing the method of manufacturing a large-size manufactured product by use of the powder sinter layered manufacturing apparatus according to the embodiment of the present invention.
Figure 11:
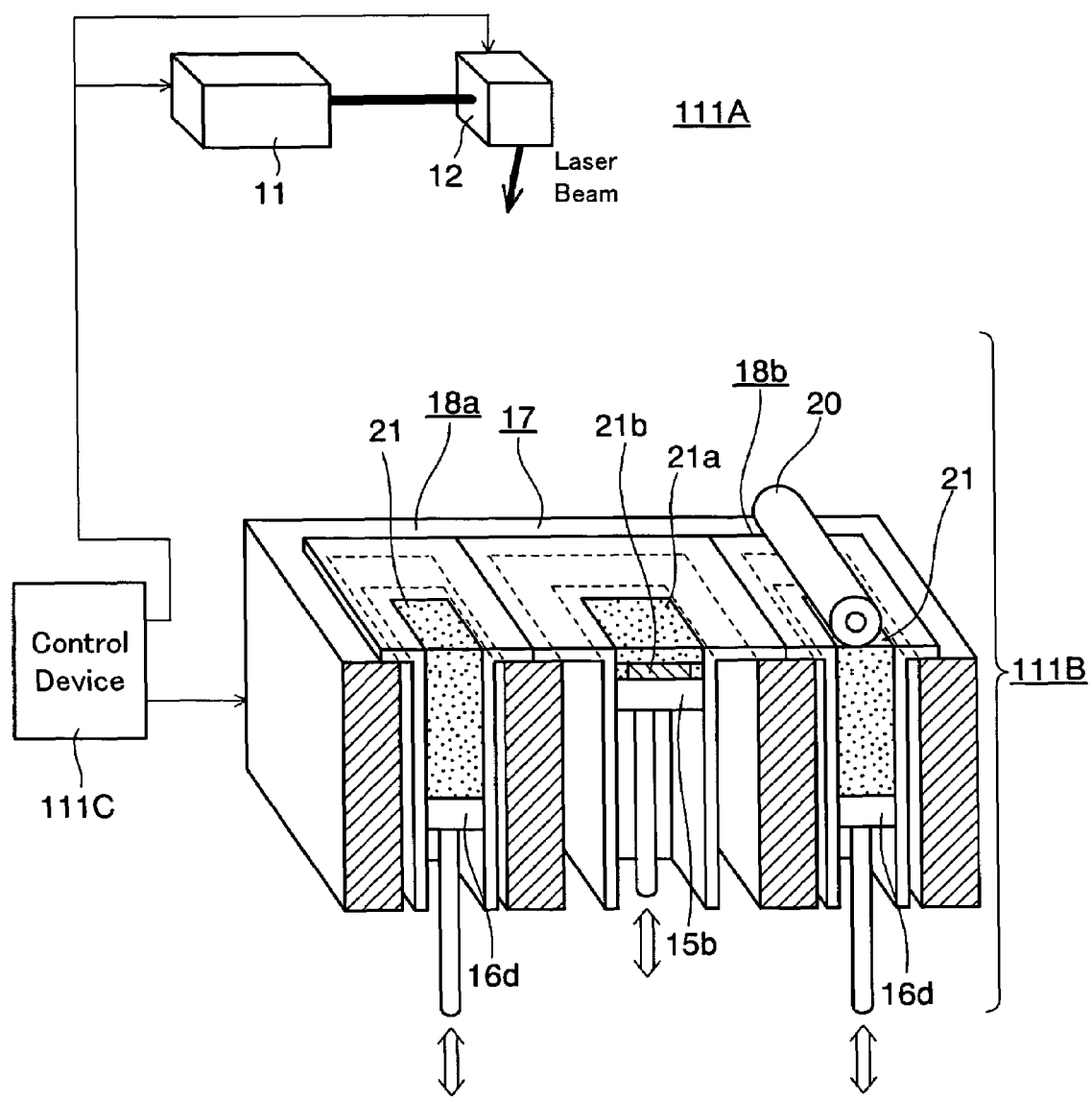
FIG. 11 is a perspective view showing the method of manufacturing a small-size manufactured product by use of the powder sinter layered manufacturing apparatus according to the embodiment of the present invention.

In addition, a recoater 20 configured to move across all of the manufacturing area and the powder material containing areas is provided as shown in FIG. 9 or FIG. 11. In association with the moving operation, the recoater 20 has functions to supply a powder material 21 stored on the first or second feed table 16b or 16d onto the first or second part table 15 or 15b, to smooth a surface of the powder material 21, and to form a powder material thin layer 21a on the first or second part table 15 or 15b. Therefore, an amount of supply of the powder material 21 is determined by an amount of elevation of the first or second feed table 16b or 16d. Meanwhile, a thickness of the powder material thin layer 21a is determined by an amount of descent of the first or second part table 15 or 15b. The powder material 21 may apply at least one selected from a group consisting of nylon, polypropylene, polylactic acid, polyethylene (PE), polyethylene terephthalate (PET), polystyrene (PS), acrylonitrile butadiene styrene copolymer (ABS), ethylene vinyl acetate copolymer (EVA), styrene acrylonitrile copolymer (SAN), and polycaprolactone. Alternatively, the powder material 21 may apply metal powder and the like.

The control device 111C makes the corresponding elements lower the first or second part table 15 or 15b by an amount equivalent to one thin layer, then supply the powder material 21 from any of the first powder material containers 14a and 14b or any of the second powder material containers 18a and 18b onto the first or second part table 15 or 15b with the recoater 20, and then form the powder material thin layer 21a on the first or second part table 15 or 15b. Next, the control device 111C makes the corresponding elements selectively heat and sinter the powder material thin layer 21a on the basis of the slice data (the drawing pattern) for the three-dimensionally manufactured product to be fabricated by use of the laser beam and the control mirror 12 (collectively constituting the heating and sintering means). The control device 111C makes the corresponding elements repeat these operations to laminate the multiple sintered thin layers so as to fabricate the three-dimensionally manufactured product.

As described above, the powder sinter layered manufacturing apparatus according to the embodiment of the present invention makes it possible to form the second manufacturing region, which is smaller than the first manufacturing region, inside the first manufacturing region by setting the second manufacturing container 17 inside the first manufacturing container 13 configured to define the large first manufacturing region. Moreover, the first and second part tables 15 and 15b which place the three-dimensionally manufactured product thereon and vertically move in the respective first and second manufacturing regions are detachably fitted to the first and second manufacturing containers 13 and 17 in conformity to the respective manufacturing regions.

Therefore, any one of a large object and a small object is manufacturable by use of the single powder sinter layered manufacturing apparatus. When manufacturing the large object, the large object is manufacturable integrally by use of the large first manufacturing region as it is. On the other hand, when manufacturing the small object, the amount of powder material remaining around the manufactured product can be reduced by forming the small second manufacturing region, and thereby cooling time after manufacturing can be shortened. In addition, the amount of the powder material to be altered by preliminary heating can be reduced.

(Description of Powder Sinter Lamination Manufacturing Method)

Figure 8A:
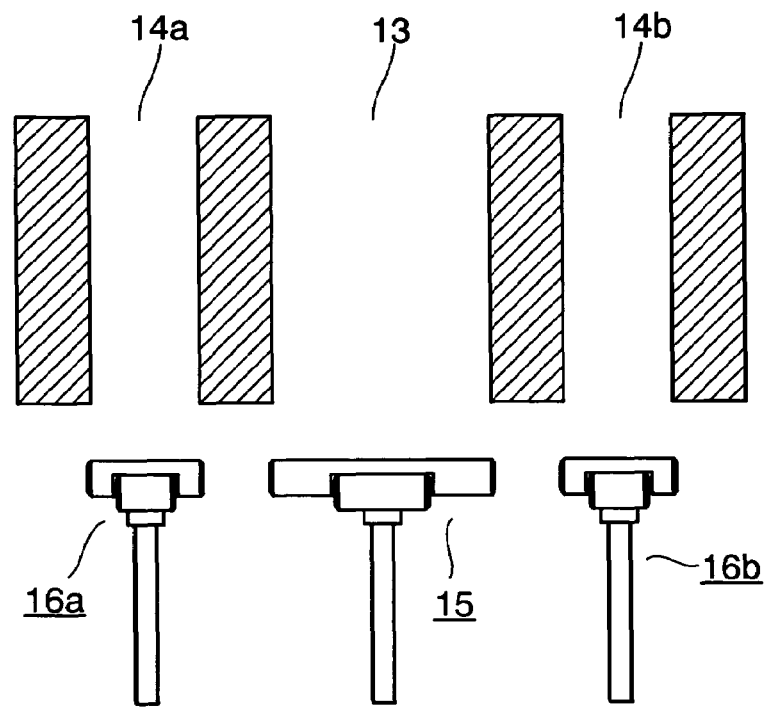
FIG. 8A is a cross-sectional view.
Figure 8B:
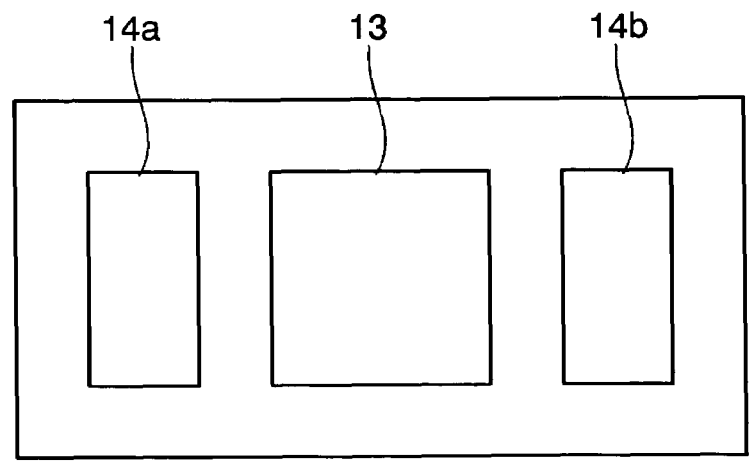
FIG. 8B is a top plan view, showing a method of manufacturing a large-size manufactured product by use of the powder sinter layered manufacturing apparatus according to the embodiment of the present invention.
Figure 10A:
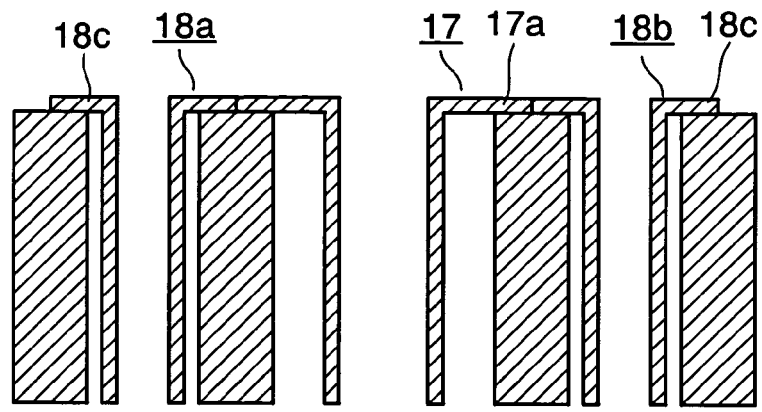
FIG. 10A is a cross-sectional view.
Figure 10B:
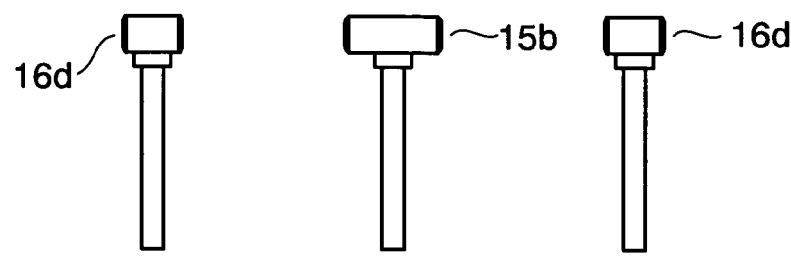
FIG. 10B is a top plan view, showing a method of manufacturing a small-size manufactured product by use of the powder sinter layered manufacturing apparatus according to the embodiment of the present invention.
Figure 10B:
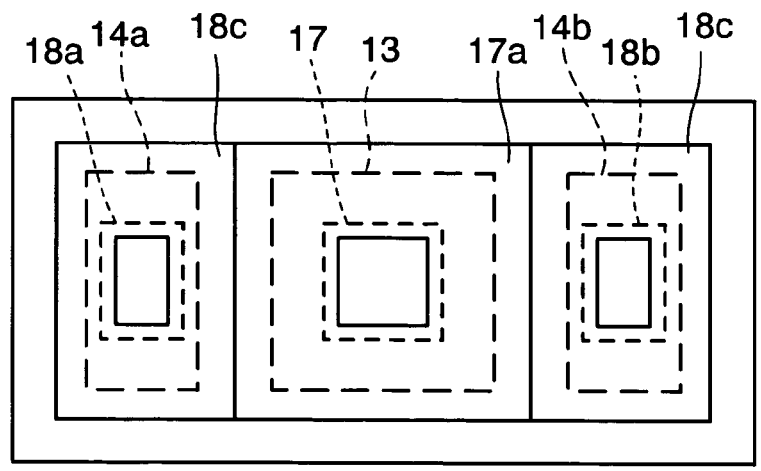

Next, a manufacturing method by use of the above-described layered manufacturing apparatus will be described with reference to FIG. 8 to FIG. 11. FIG. 8A, FIG. 8B, and FIG. 9 are views showing a method of manufacturing the large object and FIG. 10A, FIG. 10B, and FIG. 11 are views showing a method of manufacturing the small object. FIG.

8A and FIG. 10A are cross-sectional views, FIG. 8B and FIG. 10B are top plan views, and FIG. 9 and FIG. 11 are perspective views. Note that all of front walls of the first and second containers 13, 14a, 14b, 17, 18a, and 18b illustrated in FIG. 9 and FIG. 11 are omitted for facilitating the description.

First, a case of manufacturing the large object will be described with reference to FIG. 8A to FIG. 9.

First, as shown in FIGS. 8A and 8B, the second manufacturing container 17 is detached from the first manufacturing container 13, and the second powder material containers 18a and 18b are detached from the first powder material containers 14a and 14b in advance. The first tables 15, 16a, and 16b each having the increased areas of the placement surfaces by attaching the upper plate members are used herein. These tables are fitted to the first manufacturing container 13 and the first powder material containers 14a and 14b as shown in FIG. 9 so that the tables are vertically movable along the inner walls of the first manufacturing container 13 and the first powder material containers 14a and 14b.

Subsequently, the feed tables 16a and 16b on the right and left parts of the manufacturing section 111B are lowered to supply the powder materials 21 onto the feed tables 16a and 16b. In this way, sufficient amounts of the powder materials 21 are stored thereon.

Thereafter, the part table 15 is lowered by the amount equivalent to one thin layer. Then, the feed table 16b on the right side is raised to expose the powder material 21 from a flat surface thereabove.

Subsequently, the recoater 20 is caused to move so as to smooth the powder material 21 exposed from the flat surface above the feed table 16b on the right side and to carry the powder material 21 onto the part table 15 in the manufacturing container 13. In this way, the powder material thin layer 21a equivalent to one thin layer is formed on the part table 15. At this time, a surface of the powder material thin layer 21a is subjected to preliminary heating up to a temperature lower than the melting point of the powder material by around 10° C. by use of a heater (not shown) disposed on the inner wall of the manufacturing container 13 or by use of an infrared heating device (not shown) disposed obliquely above the manufacturing container 13, for example.

Next, the laser beam is emitted from the light source 11 of the laser beam emitting section 111A and the mirror 12 is controlled by the computer on the basis of the slice data of the three-dimensionally manufactured product to be fabricated, thereby selectively irradiating the laser beam on the powder material thin layer 21a. Thus, a powder material thin layer 21b is heated and sintered as shown in FIG. 9.

Next, as shown in FIG. 9, the part table 15 is lowered by the amount equivalent to one thin layer, and the feed table 16b is raised at the same time. Thereafter, the new powder material 21 is supplied onto the part table 15 and a new powder material thin layer 21a is formed on the sintered thin layer 21b as in the method described above. Subsequently, a series of operations of the heating and sintering process, formation of the powder material layer thin film 21a, the heating and sintering process, and so forth is repeated as appropriate.

In this way, the large-size three-dimensionally manufactured product is completed. Then, preliminary heating is terminated in the end and natural cooling is started. At a temperature around a room temperature, the three-dimensionally manufactured product buried in the powder materials 21 is taken out of the manufacturing container 13.

Next, a case of manufacturing the small object will be described with reference to FIG. 10A, FIG. 10B, and FIG. 11.

First, as shown in FIG. 10A, the second manufacturing container 17 and the second powder material containers 18a and 18b are attached to the first manufacturing container 13 and the first powder material containers 14a and 14b, respectively. The second tables 15b, 16d, and 16d having the reduced areas of the placement surfaces by detaching the upper plate members 15a, 16c, and 16c therefrom are used herein. These tables are fitted to the second manufacturing container 17 and the second powder material containers 18a and 18b as shown in FIG. 11 so that the tables are vertically movable along the inner walls of the second manufacturing container 17 and the second powder material containers 18a and 18b.

Subsequently, the feed tables 16d on the right and left parts of the manufacturing section 111B are lowered to supply the powder materials 21 onto the feed tables 16d. In this way, sufficient amounts of the powder materials 21 are stored thereon.

Thereafter, the part table 15b is lowered by the amount equivalent to one thin layer. Then, the feed table 16d on the right side is raised to expose the powder material 21 from the flat surface thereabove.

Subsequently, the recoater 20 is caused to move so as to smooth the powder material 21 exposed from the flat surface above the feed table 16d on the right side and to carry the powder material 21 onto the part table 15b. In this way, the powder material thin layer 21a equivalent to one layer is formed on the part table 15b. At this time, a surface of the powder material thin layer 21a is subjected to preliminary heating up to a temperature lower than the melting point of the powder material by around 10° C. by use of the heater (not shown) disposed on the inner wall of the manufacturing container 17 or by use of the infrared heating device (not shown) disposed obliquely above the manufacturing container 17, for example.

Next, the laser beam is emitted from the light source 11 of the laser beam emitting section 111A and the mirror 12 is controlled by the computer on the basis of the slice data of the three-dimensionally manufactured product to be fabricated, thereby selectively irradiating the laser beam on the powder material thin layer 21a. In this way, a powder material thin layer 21b is heated and sintered as shown in FIG. 11.

Next, as shown in FIG. 11, the part table 15b is lowered by the amount equivalent to one thin layer, and the other feed table 16d is raised at the same time. Thereafter, the new powder material 21 is supplied onto the part table 15b and a new powder material thin layer 21a is formed on the sintered thin layer 21b as in the method described above. Subsequently, a series of operations of the heating and sintering process, formation of the new powder material layer thin film 21a, the heating and sintering process, and so forth is repeated as appropriate.

In this way, the small-size three-dimensionally manufactured product is completed. Then, preliminary heating is terminated in the end and natural cooling is started. At a temperature around a room temperature, the three-dimensionally manufactured product buried in the powder materials 21 is taken out of the second manufacturing container 17. At this time, there are small contents of the powdered materials left on the three-dimensionally manufactured product inside the second manufacturing container 17 and on the periphery thereof. Accordingly, it is made possible to suppress the cooling time required before a breakout as short as the time required in the case of a small-size layered manufacturing apparatus. Moreover, the amount of the powder materials to be altered by preliminary heating can be reduced.

In this way, it is made possible to improve efficiency of operations of the device, and to prevent increase of manufacturing costs.

Although the powder sinter layered manufacturing apparatus of this invention has been described in detail with reference to a certain embodiment, it is to be understood that the scope of this invention will not be limited to the specific example as described in this embodiment. It is intended for the subject matter of the invention to include all modifications and changes of the embodiment without departing from the spirit and scope of the invention.

Figure 12:
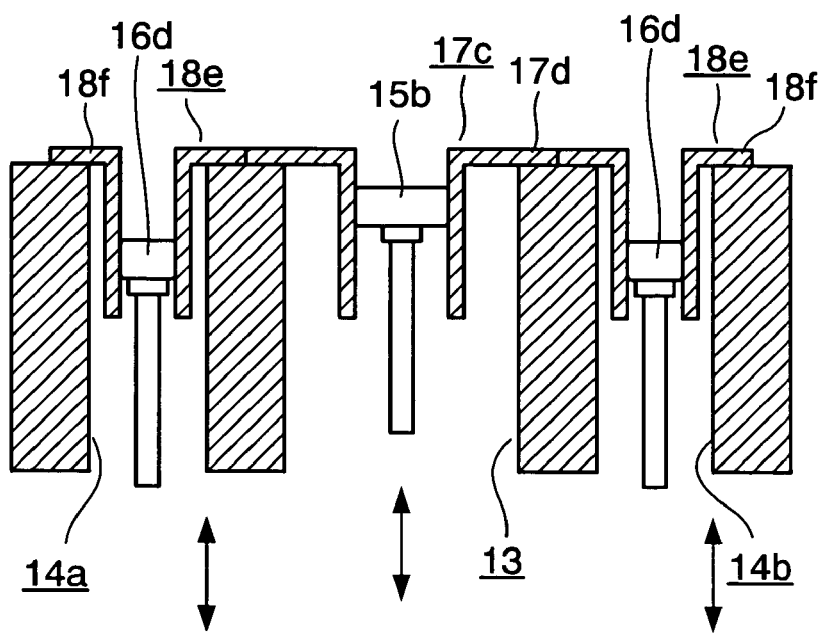
FIG. 12 is a cross-sectional view showing modified configurations of the second manufacturing container and the second powder material container in the powder sinter layered manufacturing apparatus according to the embodiment of the present invention.

For example, in the powder sinter layered manufacturing apparatus of this embodiment, the second manufacturing container 17 and the first manufacturing container 13 are set to the same depth and the second powder material containers 18a and 18b and the first powder material containers 14a and 14b are set to the same depth as shown in FIG. 2, FIG. 3A, and FIG. 10A. Instead, as shown in FIG. 12, the depth of a second manufacturing container 17c, second powder material containers 18e and 18e may be set shallower than the depth of the first manufacturing container 13 or the depth of the first powder material containers 14a and 14b in response to the size of the manufactured product. Note that, in FIG. 12, reference numeral 17d denotes a flange of the second manufacturing container 17c, and reference numeral 18f denotes a flange of each of the second powder material containers 18e and 18e. Other reference numerals identical to those in FIGS. 10A and 10B denote the same constituents in the drawings.

In addition, in the powder sinter layered manufacturing apparatus of this embodiment, the cross-sectional shapes of the first manufacturing container 13, the first powder material containers 14a and 14b, the second manufacturing container 17, and the second powder material containers 18a and 18b are all rectangular. However, the cross-sectional shapes are not limited to the foregoing. Circular shapes or any other polygonal shapes are applicable.

Figure 13:
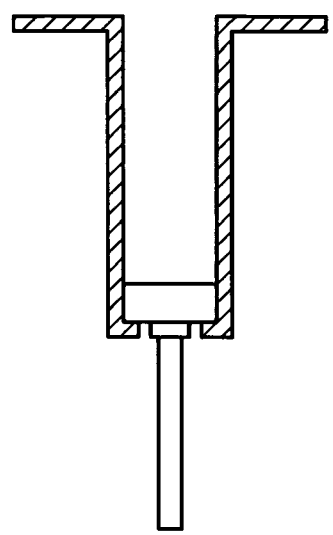
FIG. 13 is a cross-sectional view showing another modified configurations of the second manufacturing container and the second powder material container in the powder sinter layered manufacturing apparatus according to the embodiment of the present invention.

Moreover, an inner diameter of each of the first and second manufacturing containers 13 and 17 and the first and second powder material containers 14a, 14b, 18a, and 18b of a cylindrical shape is the same from the top end to the bottom end. Accordingly, the first and second part tables 15 and 15b and the first ant second feed tables 16a, 16b, and 16b may be pulled out of lower ends of the first and second manufacturing containers 13 and 17 and the first and second powder material containers 14a, 14b, 18a, and 18b. Instead, as shown in FIG. 13, it is made possible to bend at least one of the lower ends of the first and second manufacturing containers and the first and second powder material containers of a cylindrical shape, so that the table is stopped and supported by the lower end when the table reaches the bottom of the relevant container.

Figure 14A:
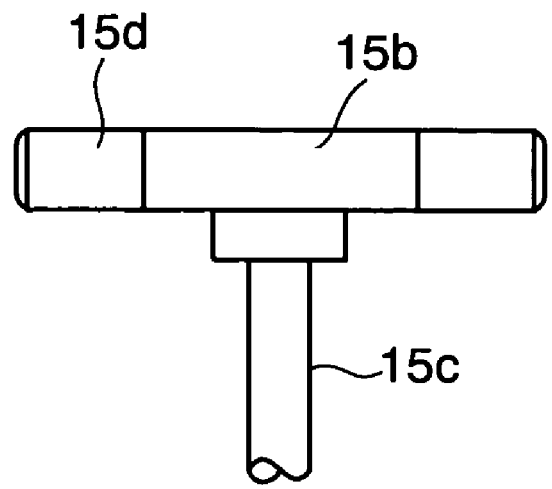
FIG. 14A is a cross-sectional view.
Figure 14B:
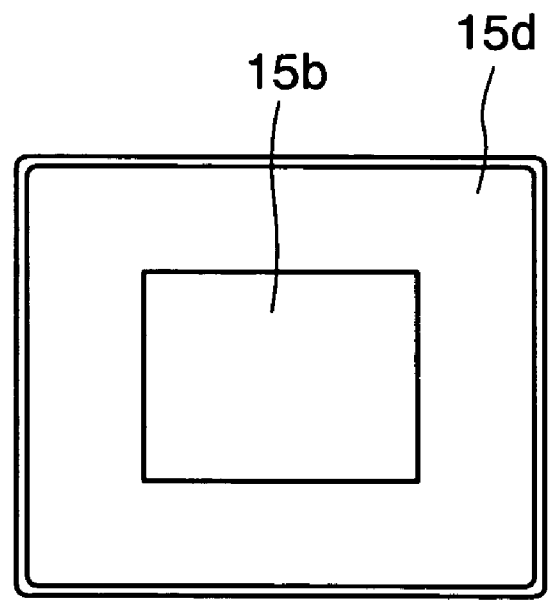
FIG. 14B is a top plan view, showing another configuration of the part table used in the powder sinter layered manufacturing apparatus according to the embodiment of the present invention.

Meanwhile, in the above-described embodiment, the first part table 15 is formed by putting the plate member 15a on the second part table 15b. Instead, as shown in FIGS. 14, the first part table 15 may be formed by fitting a ring-shaped plate member 15d designed to expand a peripheral portion of the second part table 15b. Note that FIG. 14A is a cross-sectional view and FIG. 14B is a top plan view showing such a configuration. This structure is also applicable to the powder material supply table.

As described above, according to the powder sinter layered manufacturing apparatus of the present invention, both of the large object and the small object are manufacturable by use of the single powder sinter layered manufacturing apparatus. This is achieved by forming the large first manufacturing region for manufacturing the large object and by forming the small second region for manufacturing the small object within the first manufacturing region.

Moreover, when manufacturing the large object, since the large first manufacturing region is used for manufacturing the large object, the large object is manufacturable integrally.

When manufacturing the small object, by use of the small second manufacturing region, cooling time after manufacturing can be shortened even in the case of preliminary heating, and the amount of the powder material altered by preliminary heating can be reduced.

What is claimed is:

1. A powder sinter layered manufacturing apparatus comprising:
    a first partition wall which defines a first manufacturing region;
    a first table which moves vertically along an inner wall of the first partition wall;
    a second partition wall which defines a second manufacturing region inside the first manufacturing region and has a flange to be hooked on an upper end of the first partition wall; and
    a second table which moves vertically along an inner wall of the second partition wall,
    wherein a large object is manufactured in the first manufacturing region and a small object is manufactured in the second manufacturing region.

2. The powder sinter layered manufacturing apparatus according to claim 1,
    wherein the first table is formed by putting a plate member on the second table.

3. The powder sinter layered manufacturing apparatus according to claim 1,
    wherein the first table is formed by fitting a plate member to the second table, the plate member being designed to expand a peripheral portion of the second table.

4. The powder sinter layered manufacturing apparatus according to claim 1, further comprising:
    driving means for causing the first and second tables to move vertically.

5. The powder sinter layered manufacturing apparatus according to claim 4,
    wherein the driving means is detachable from the first and second tables.

6. The powder sinter layered manufacturing apparatus according to claim 1,
    wherein at least one of a lower end of the first partition wall and a lower end of the second partition wall is designed to allow the relevant table to be pulled out of the lower end.

7. The powder sinter layered manufacturing apparatus according to claim 1,
    wherein at least one of a lower end of the first partition wall and a lower end of the second partition wall is designed to enable the corresponding table to be hooked at the lower end.

8. The powder sinter layered manufacturing apparatus according to claim 1, further comprising:
    powder material container disposed adjacent to the first manufacturing region; and
    laser beam irradiating means for selectively irradiating a laser beam onto a powder material thin layer to be formed on any of the first and the second table, wherein a powder material thin layer is formed on any of the first and second tables by supplying a powder material to any of the first and second manufacturing regions, a sintered thin layer is formed by selectively irradiating the laser beam onto the powder material thin layer, and the sintered layers are laminated to fabricate a three-dimensionally manufactured product by repeating the formation of the powder material thin layer and the formation of the sintered thin layer.

* * * * *